US008355820B2

(12) United States Patent
Kornegay

(10) Patent No.: US 8,355,820 B2
(45) Date of Patent: Jan. 15, 2013

(54) OVEN TESTING FIXTURE AND METHOD

(75) Inventor: Brandon Kornegay, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 400 days.

(21) Appl. No.: 12/825,430

(22) Filed: Jun. 29, 2010

(65) Prior Publication Data

US 2011/0320041 A1 Dec. 29, 2011

(51) Int. Cl.
*G06F 19/00* (2006.01)

(52) U.S. Cl. ........................... 700/275; 91/459; 219/701

(58) Field of Classification Search .................... 700/10, 700/275, 89; 91/459; 219/701; 312/326
See application file for complete search history.

(56) References Cited

U.S. PATENT DOCUMENTS 3,119,000 A 1/1964 Loch et al.
4,072,846 A * 2/1978 Christen et al. ............... 219/497
4,136,667 A * 1/1979 Lewis ........................... 126/197
4,230,532 A * 10/1980 Harris ........................... 202/248
4,302,660 A 11/1981 Swanson et al.
4,450,335 A * 5/1984 Shimizu et al. ............... 219/723
4,924,763 A 5/1990 Bingham
7,282,674 B2 10/2007 Hansen et al.
7,331,298 B2 * 2/2008 Barkdoll et al. .......... 110/173 R
2004/0036698 A1 * 2/2004 Thurner et al. ............... 345/619
2005/0121918 A1 * 6/2005 Smock et al. ................. 292/109
2005/0284494 A1 * 12/2005 Lee ............................... 132/225
2007/0214725 A1 * 9/2007 Miyashita ....................... 49/340

* cited by examiner

*Primary Examiner* — Kidest Bahta
(74) *Attorney, Agent, or Firm* — James E. Howard; Andre Pallapies

(57) ABSTRACT

A testing apparatus is provided for opening and closing a door of an appliance being tested. The apparatus includes a framework; a first actuator attached to the framework, the first actuator having a retracted position and an extended position; a first attaching bar attached to the first actuator and to the door; and a controller for controlling the first actuator such that the first actuator causes the door to move to an open position when the actuator moves from a first one of the extended position and the retracted position to the other of the extended position and the retracted position, and the first actuator causes the door to move to a closed position when the actuator moves from the other of the extended position and the retracted position to the first one of the extended position and the retracted position.

19 Claims, 3 Drawing Sheets

OVEN TESTING FIXTURE AND METHOD

FIELD OF THE INVENTION

The invention is directed to an apparatus for automating testing of an appliance, and, more particularly to an apparatus for automatically opening and closing an oven door during testing of the oven.

BACKGROUND OF THE INVENTION

Appliances such as, for example, ovens require testing that includes heating the oven to a predetermined temperature and then opening a door of the oven for a predetermined time to allow the oven to cool down. Currently, a worker needs to attend to the oven being tested in order to manually open and close the door at the predetermined times. This procedure is costly in terms of labor and can be inconsistent due to the worker not opening or closing the door at exactly the predetermined times.

SUMMARY

The invention recognizes that it is desirable to provide a testing apparatus that automatically opens and closes a door, or doors, of an appliance in accordance with a predetermined program to ensure uniformity of testing and to reduce the amount of labor required. These properties are provided by an apparatus and method of the invention.

Exemplary embodiments of the invention provide a framework for positioning an actuator relative to an appliance being tested such that a door, or doors, of the appliance can be opened and closed automatically.

Particular embodiments of the invention are directed to a testing apparatus for opening and closing a first door of an appliance being tested. The apparatus includes a framework; a first actuator attached to the framework, the first actuator having a retracted position and an extended position; a first attaching bar attached to the first actuator, the attaching bar for attaching the first actuator to the first door of the appliance; and a controller for controlling the first actuator such that the first actuator causes the first door of the appliance to move to an open position when the actuator moves from a first one of the extended position and the retracted position to the other of the extended position and the retracted position, and the first actuator causes the first door of the appliance to move to a closed position when the actuator moves from the other of the extended position and the retracted position to the first one of the extended position and the retracted position.

Other embodiments of the invention are directed to a method of testing an appliance having a first door. The method includes positioning the appliance in a space in a framework; attaching a first attaching bar to the first door, the first attaching bar being attached to a first actuator, the first actuator being attached to the framework and having a retracted position and an extended position; and controlling the first actuator with a controller such that the first actuator causes the first door of the appliance to move to an open position when the actuator moves from a first one of the extended position and the retracted position to the other of the extended position and the retracted position, and the first actuator causes the first door of the appliance to move to a closed position when the actuator moves from the other of the extended position and the retracted position to the first one of the extended position and the retracted position.

The invention has proven to reduce the amount of labor needed and to improve uniformity of testing from one test appliance to the next.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

Figure 1:
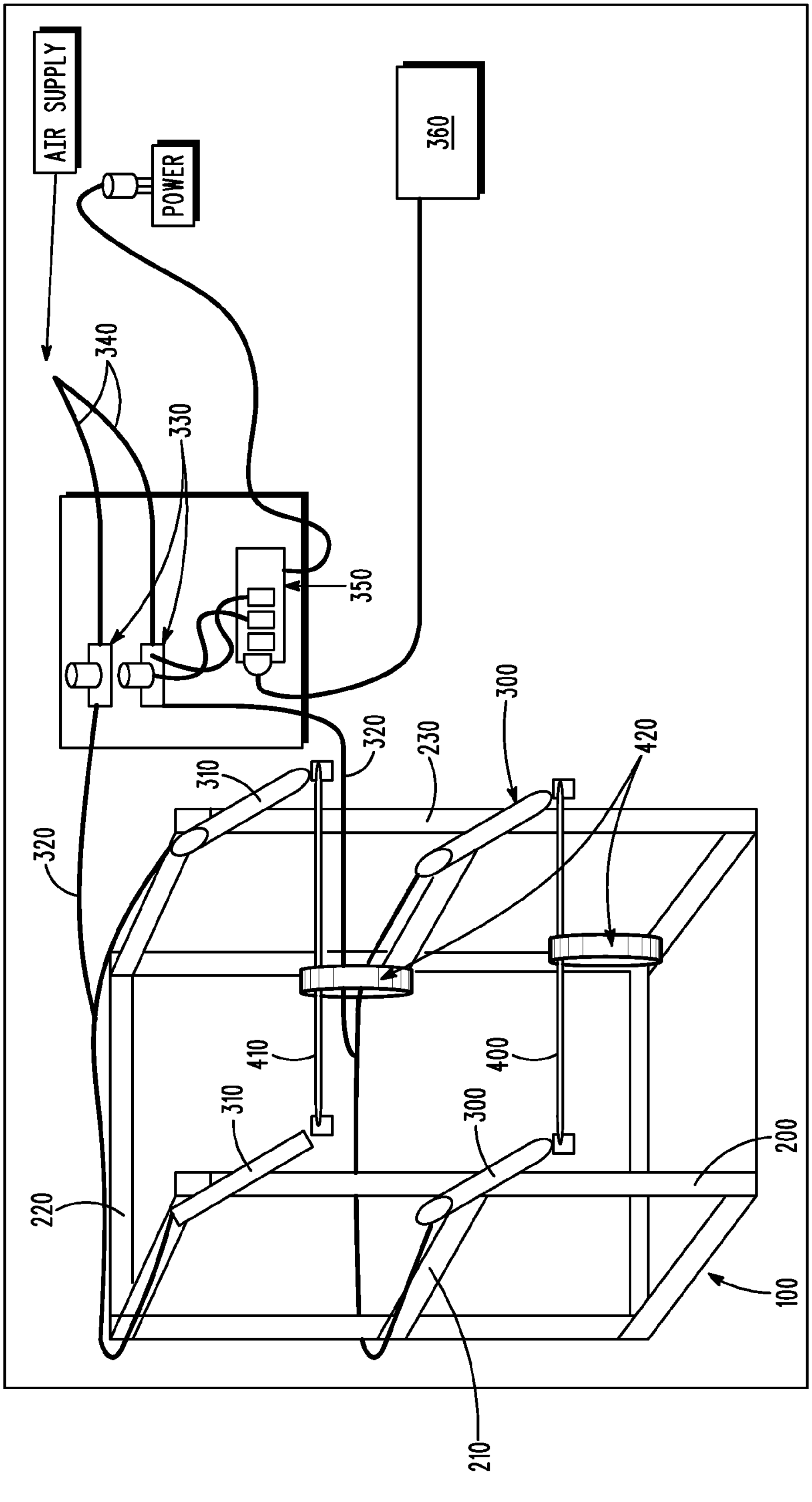
FIG. 1 is a schematic drawing of a system in accordance with an exemplary embodiment of the invention.

FIG. 1 shows a test apparatus in accordance with an exemplary embodiment of the invention. This example is a test apparatus for opening and closing a door, or doors, of an oven during testing. FIG. 1 shows an oven cooling test apparatus 100 that has a framework 200 that has a space in which an oven to be tested can be placed. Framework 200 has a left side framework 210, a rear framework 220, and a right side framework 230. The specific pattern or design of the framework is just one example of a framework that can be used. Other patterns or designs can also be used as long as the various elements discussed below are held in the proper positions relative to the oven being tested.

FIG. 1 shows a lower horizontal rod 400 having an attachment band 420. Attachment band 420 attaches lower horizontal rod 400 to a handle of an oven being tested. The handle can be the lower handle of a double oven, or the handle of a single oven. Attachment band 420 can be, for example, a hook and loop fastener. Similarly, an upper horizontal rod 410 is shown having an attachment band 420. Attachment band 420 attaches lower horizontal rod 400 to a handle of an upper oven of a double oven being tested. Attachment band 420 can be, for example, a hook and loop fastener.

Lower horizontal rod 400 and upper horizontal rod 410 are attached to framework 200 by way of actuators. In this example, two lower actuators 300 attach lower horizontal rod 400 to framework 200 and two upper actuators 310 attach upper horizontal rod 410 to framework 200. Other additional members or levers (not shown) can be provided to guide the actuators along the desired paths. Lower actuators 300 and upper actuators 310 are, in this example, pneumatic. Lower actuators 300 are connected by air lines 320 to an air solenoid 330 and upper actuators 310 are connected by separate air lines 320 to a separate air solenoid 330. This setup allows lower actuators 300 to be controlled independently from upper actuators 310. Both air solenoids 330 are connected to an air supply by air lines 340. Although pneumatic actuators are shown in this example, hydraulic, electric or other actuators can also be used.

Also shown in FIG. 1 are a relay board 350 and a controller 360. The combination of relay board 350 and controller 360 operate the actuators in accordance with a program having predetermined durations for the opening and closing of the oven doors. For example, controller 360 can direct upper actuators 310 to keep the upper door of the oven closed for a predetermined time while various tests are run on the oven. Controller 360 can then direct upper actuators 310 to open the upper door for a predetermined time to allow the oven temperature to drop to a level at which the oven can be removed from the framework and advanced to a subsequent station. Other, more complicated, programs can be used by the controller to control the opening and closing of the oven doors for various different testing procedures. Also, the actuators can be controlled to open the oven doors at various different positions (for example, open 5 degrees from vertical, open 15 degrees from vertical, open 45 degrees from vertical, etc.).

The controller can be any type of mechanical, electrical, or electro-mechanical controller. For example, the controller can be a computer that can be reprogrammed by an operator to adapt the apparatus to specific testing requirements and/or specific ovens or other appliances.

Figure 2:
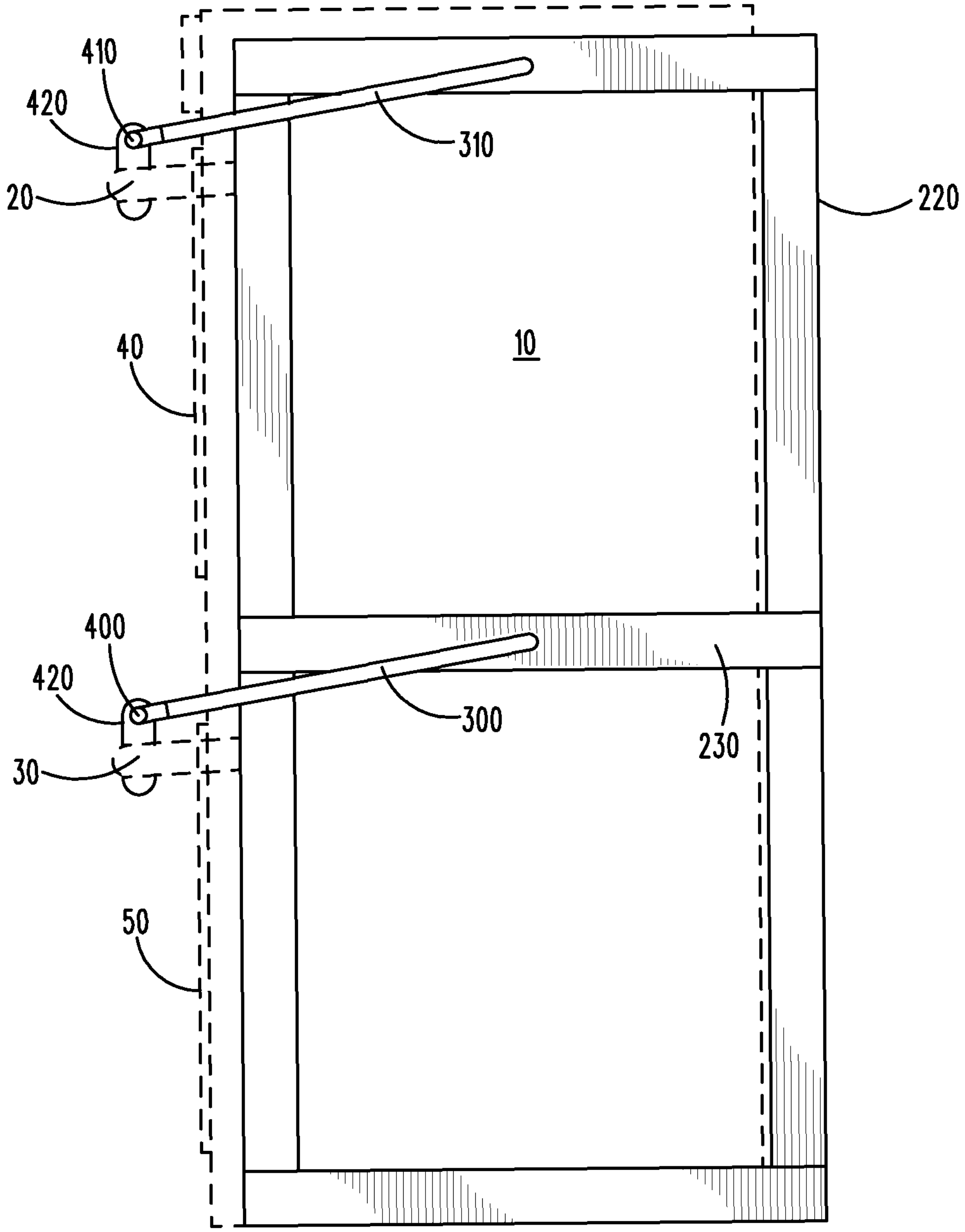
FIG. 2 is a side view of the embodiment shown in FIG. 1 with the oven doors closed.

FIG. 2 is a side view of apparatus 100 with an oven 10 in position within apparatus 100. Oven 10 is shown in broken lines for clarity. FIG. 2 shows an upper oven door 40 and a lower oven door 50 in closed positions. Upper oven handle 20 is attached to upper horizontal rod 410 by attachment band 420. Similarly, lower oven handle 30 is attached to lower horizontal rod 420 by attachment band 420.

Figure 3:
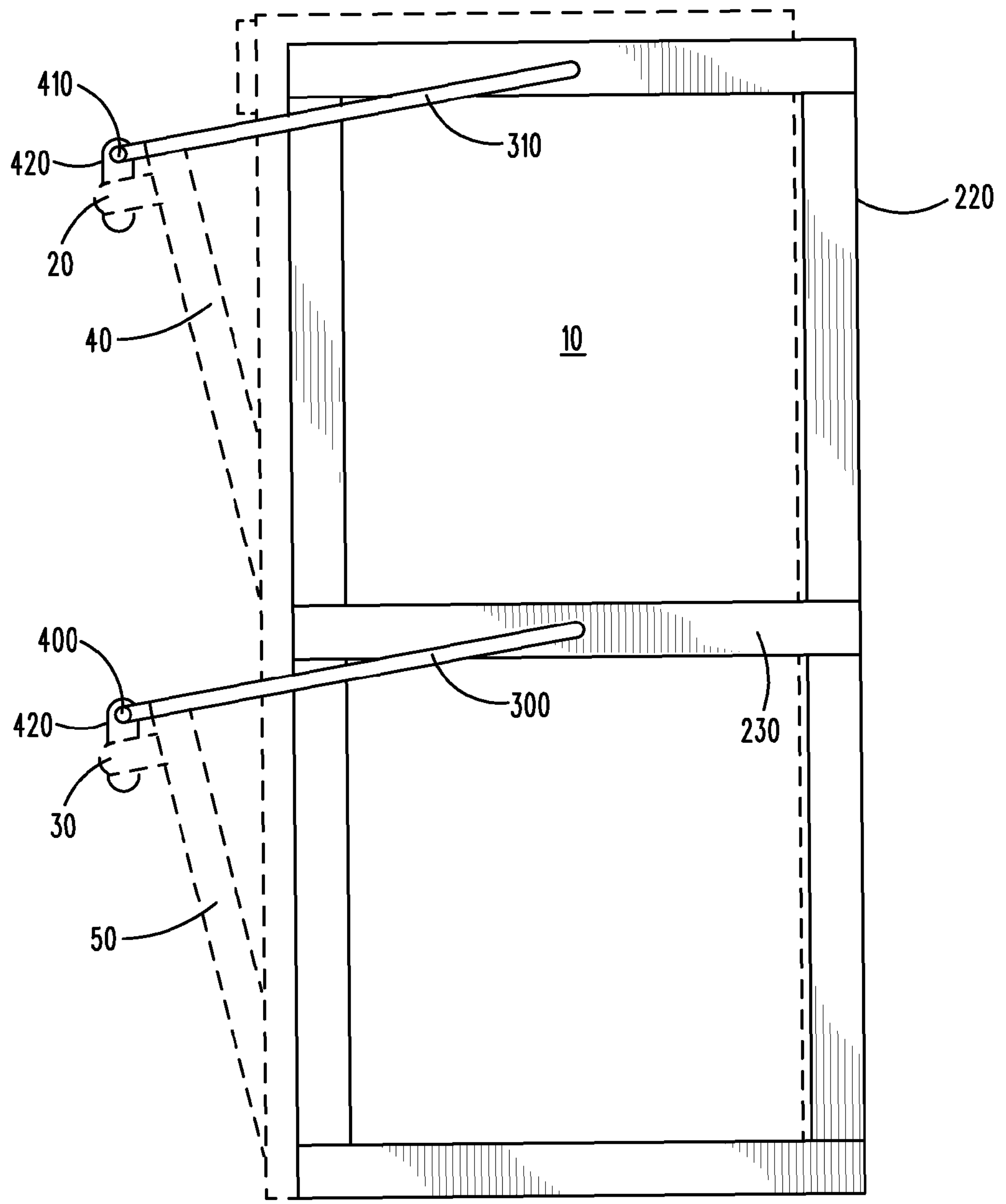
FIG. 3 is a side view of the embodiment shown in FIG. 1 with the oven doors open.

FIG. 3 is a side view of apparatus 100 with upper oven door 40 and a lower oven door 50 in open positions. Upper actuators 310 and lower actuators 300 are shown in extended positions which results in upper oven door 40 and a lower oven door 50 being in the open positions.

While the example shown includes two upper actuators 310 and two lower actuators 300, a single upper actuator and/or a single lower actuator can be used as long as sufficient structure is provided to properly and securely control the motion of the oven doors. Alternatively, three or more actuators can be used.

While the example shown uses attachment bands 420 to attach the horizontal rods to the oven door handles, other attachment methods can be used. For example, clamps or other rigid connections can be used.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the invention.

What is claimed is:

1. A testing apparatus for opening and closing a first door of an appliance being tested, the apparatus comprising:

a framework;

a first actuator attached to the framework, the first actuator having a retracted position and an extended position;

a first attaching bar attached to the first actuator, the attaching bar for attaching the first actuator to the first door of the appliance; and a controller for controlling the first actuator such that the first actuator causes the first door of the appliance to move to an open position when the actuator moves from a first one of the extended position and the retracted position to the other of the extended position and the retracted position, and the first actuator causes the first door of the appliance to move to a closed position when the actuator moves from the other of the extended position and the retracted position to the first one of the extended position and the retracted position.

2. The apparatus of claim 1, wherein the controller includes a program that actuates the first actuator in accordance with a first predetermined time table such that the first actuator causes the first door of the appliance to remain in the closed position for a first predetermined time and then causes the first door of the appliance to move to the open position for a second predetermined time.

3. The apparatus of claim 2, further comprising a second actuator, the second actuator being attached to the first attaching bar and being actuated in unison with the first actuator.

4. The apparatus of claim 3, wherein the first actuator is attached to a first end of the first attaching bar, and the second actuator is attached to a second end of the first attaching bar.

5. The apparatus of claim 4, further comprising a first attachment band for removably attaching the first attachment bar to a handle of the first door of the appliance.

6. The apparatus of claim 5, wherein the first actuator is removably attached to the first attaching bar such that the first attaching bar can be disconnected from the first actuator to allow the appliance to be moved into a space in the framework.

7. The apparatus of claim 6, wherein the first and second actuators are pneumatic and are pneumatically connected to an air solenoid.

8. The apparatus of claim 7, wherein the appliance is an oven and the first predetermined time is a time period during which a temperature inside the oven rises, and the second predetermined time is a time period during which the temperature inside the oven decreases.

9. The apparatus of claim 8, further comprising a third actuator;

a fourth actuator;

a second attaching bar having a first end attached to the third actuator, and a second end attached to the fourth actuator; and a second attachment band for removably attaching the second attaching bar to a handle of a second door of the appliance.

10. The apparatus of claim 9, wherein the program actuates the third and fourth actuators in accordance with a second predetermined time table such that the third and fourth actuators cause the second door of the appliance to remain in a closed position for a third predetermined time and then causes the second door of the appliance to move to an open position for a fourth predetermined time.

11. A method of testing an appliance having a first door, the method comprising:

positioning the appliance in a space in a framework;

attaching a first attaching bar to the first door, the first attaching bar being attached to a first actuator, the first actuator being attached to the framework and having a retracted position and an extended position; and controlling the first actuator with a controller such that the first actuator causes the first door of the appliance to move to an open position when the actuator moves from a first one of the extended position and the retracted position to the other of the extended position and the retracted position, and the first actuator causes the first door of the appliance to move to a closed position when the actuator moves from the other of the extended position and the retracted position to the first one of the extended position and the retracted position.

12. The method of claim 11, wherein the first actuator is actuated in accordance with a first predetermined time table such that the first actuator causes the first door of the appliance to remain in the closed position for a first predetermined time and then causes the first door of the appliance to move to the open position for a second predetermined time.

13. The method of claim 12, further comprising controlling a second actuator, the second actuator being attached to the first attaching bar and being actuated in unison with the first actuator.

14. The method of claim 13, further comprising attaching the first actuator to a first end of the first attaching bar, and attaching the second actuator to a second end of the first attaching bar.

15. The method of claim 14, further comprising removably attaching the first attachment bar to a handle of the first door of the appliance with a first attachment band.

16. The method of claim 15, further comprising removably attaching the first actuator to the first attaching bar such that the first attaching bar can be disconnected from the first actuator to allow the appliance to be positioned in the space in the framework.

17. The method of claim 16, wherein the first and second actuators are pneumatic and are pneumatically connected to an air solenoid.

18. The method of claim 17, wherein the appliance is an oven and the first predetermined time is a time period during which a temperature inside the oven rises, and the second predetermined time is a time period during which the temperature inside the oven decreases.

19. The method of claim 18, wherein the program actuates third and fourth actuators in accordance with a second predetermined time table such that the third and fourth actuators cause a second door of the appliance to remain in a closed position for a third predetermined time and then causes the second door of the appliance to move to an open position for a fourth predetermined time.

* * * * *